United States Patent [19]

Schuler

[11] Patent Number: 4,799,800
[45] Date of Patent: Jan. 24, 1989

[54] FEED MIXER

[75] Inventor: Dorland H. Schuler, Griswold, Iowa

[73] Assignee: Schuler MFG. & Equip. Co., Inc., Griswold, Iowa

[21] Appl. No.: 924,207

[22] Filed: Oct. 28, 1986

[51] Int. Cl.$^4$ ............................................. B01F 7/04
[52] U.S. Cl. ...................................... 366/296; 366/603
[58] Field of Search ............... 366/603, 296, 294, 295, 366/297, 299, 300, 64, 66, 292, 293

[56] References Cited

U.S. PATENT DOCUMENTS

| | | | |
|---|---|---|---|
| 616,371 | 12/1898 | Swearengen | 366/296 |
| 2,010,579 | 8/1935 | Broadfield | 366/296 |
| 3,638,920 | 3/1972 | Davis . | |
| 3,672,640 | 6/1972 | Crose | 366/300 |
| 3,995,836 | 12/1976 | Carter | 366/300 |
| 4,310,252 | 1/1982 | Ryan | 366/300 |
| 4,447,158 | 5/1984 | Simon | 366/297 |
| 4,480,927 | 11/1984 | Peat | 366/300 |
| 4,506,990 | 2/1985 | Neier et al. . | |
| 4,597,672 | 11/1986 | Neier et al. . | |

OTHER PUBLICATIONS

Davis Trailer-Mounted Transit Mixer Feeder.
Davis Agitator-Auger Mixer (date unknown).
The Farm Aid Mixer-Feeder Wagon.
Richard Keenan Easi-Feeder (date unknown).
Roto-Mix Feed Mixers.
Steiner TMR Feed Handling Equipment (date unknown).
Stirco Feed Mixer.

*Primary Examiner*—Robert W. Jenkins
*Attorney, Agent, or Firm*—Zarley McKee, Thomte, Voorhees & Sease

[57] ABSTRACT

A feed mixer is provided and includes a mixing chamber with forward and rearward end walls, a bottom wall, and opposite side walls. A first and second mixing reel is rotatably mounted in end-to-end relationship within the chamber, with each reel including an axle and a plurality of elongated mixing paddles operatively connected to the axle. The reels are rotated in opposite directions, whereby each reel offsets the side loading of the feed by the other reel and thereby maintain the center of gravity of the feed along the longitudinal center line of the chamber. First and second augers extend along the respective side walls of the chamber and are rotated in opposite directions. The first auger moves feed away from the first reel and discharges feed into the second reel, while the second auger moves feed away from the second reel and discharges feed into the first reel. Thus, the feed is thoroughly mixed by the dual reels and dual augers.

13 Claims, 2 Drawing Sheets

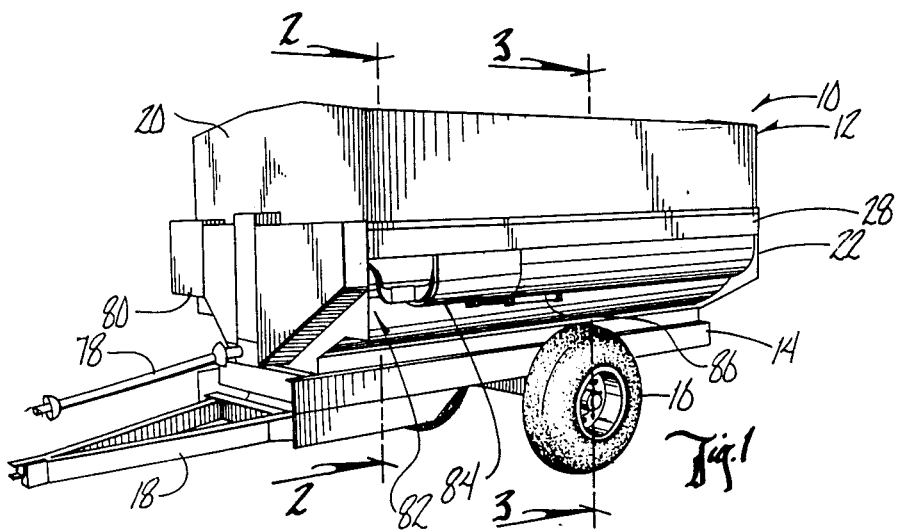
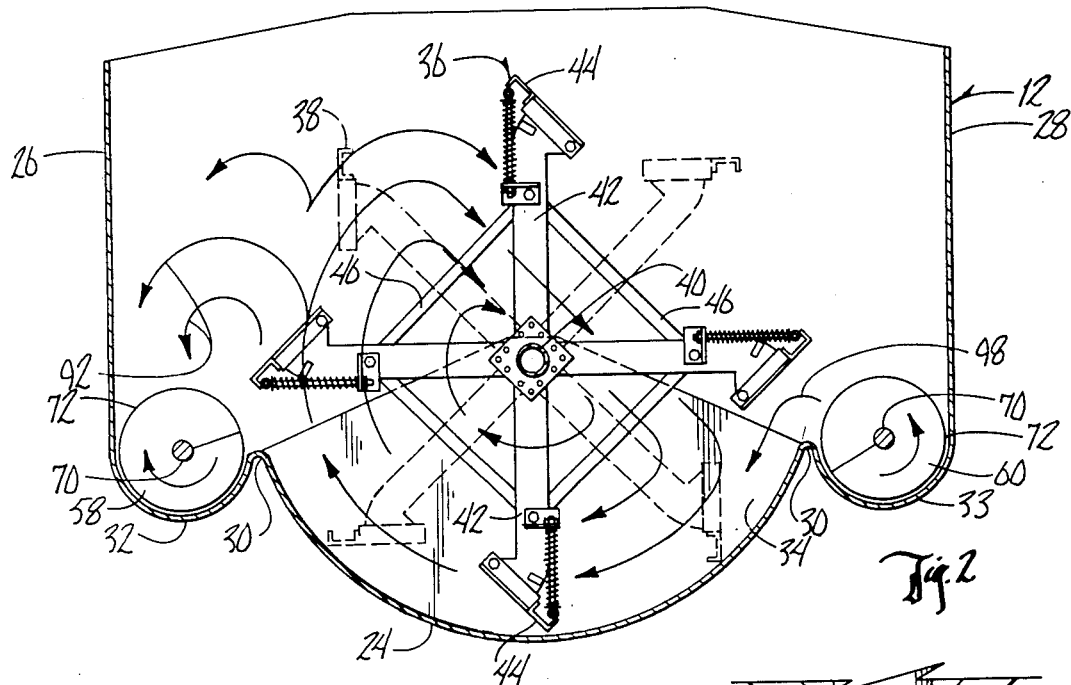
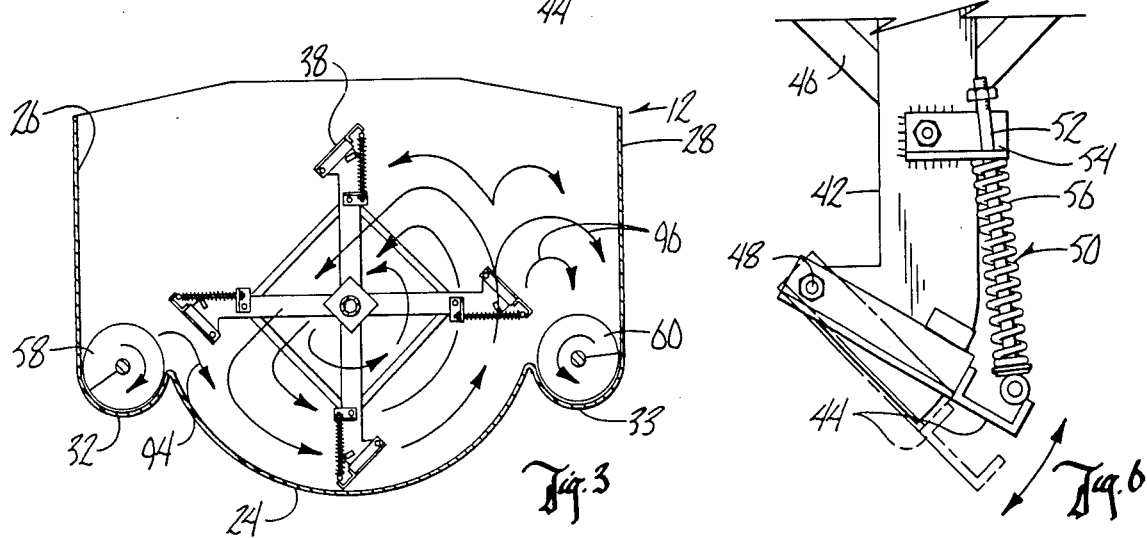

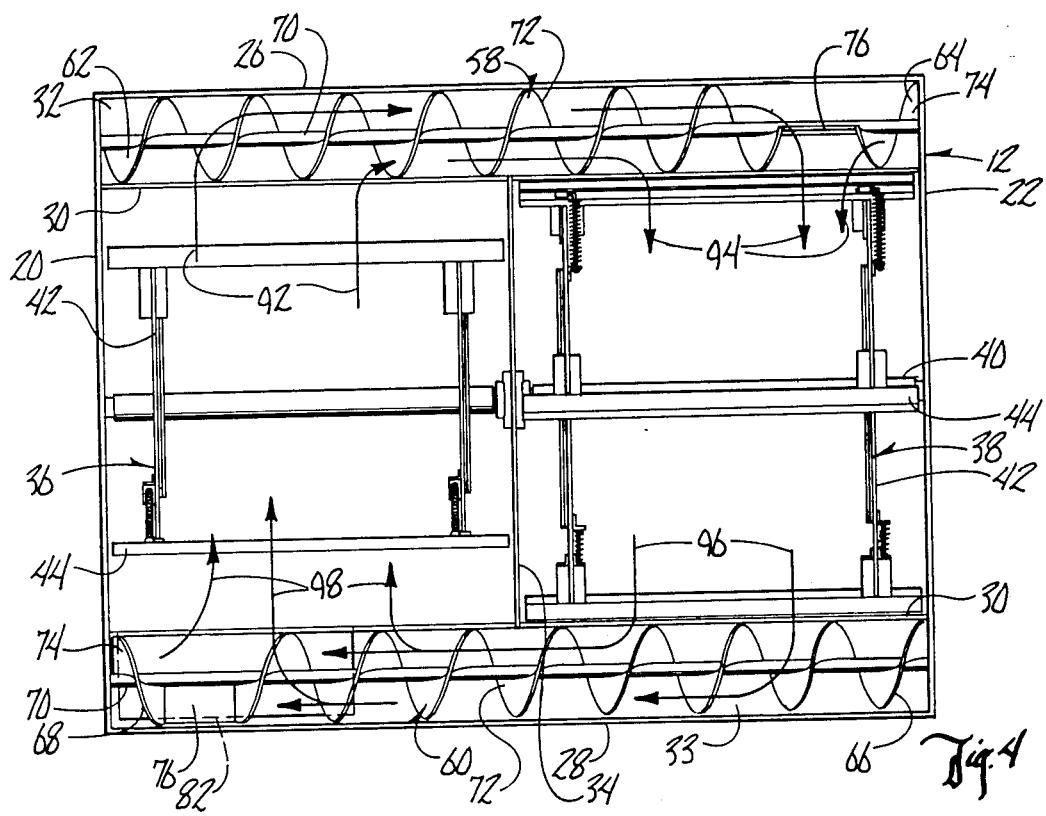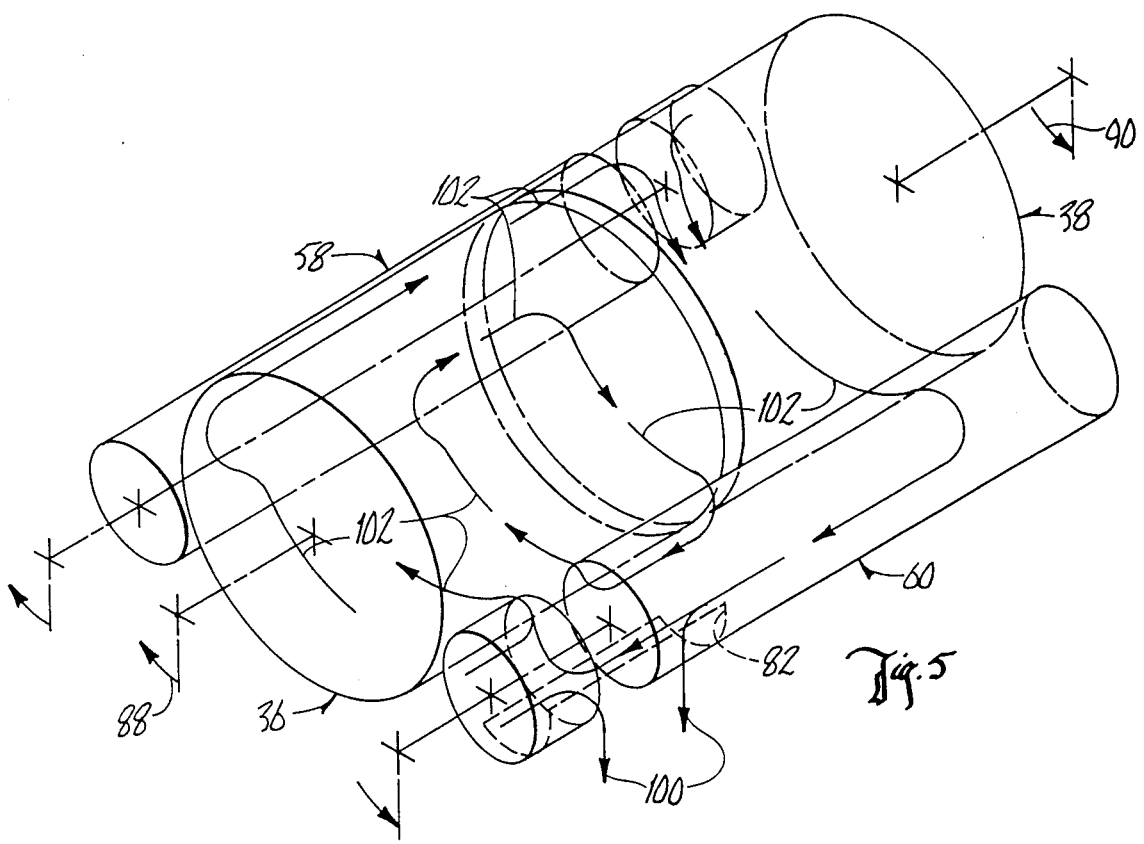

FEED MIXER

BACKGROUND OF THE INVENTION

The present invention is directed generally to an improved feed mixer for grain, hay, silage, and other livestock feed substances. Conventional feed mixers typically have an elongated chamber with a rotatable reel extending along the length of the chamber for mixing the feed. One or more augers have been used to convey the feed from one end of the chamber to the other, and for discharging the mixed feed.

These conventional feed mixers have several shortcomings. First, since the reel rotates in one direction, there is a tendency for the feed being mixed to be loaded to one side of the chamber such that the center of gravity of the feed is not in the center of the chamber. Also, the conveying augers are usually mounted at an elevation above the central axle of the reel, thereby necessitating increased power for driving the reel which must lift the feed up to the auger. Furthermore, there is a tendency for the reel paddles to bind against the bottom wall of the chamber when lumps of feed are encountered. Finally, hay and the like often becomes wrapped around the auger shaft, thereby impairing the operation of the auger.

Accordingly, a primary objective of the present invention is the provision of an improved feed mixer.

Another objective of the present invention is the provision of a feed mixer having dual reels which rotate in opposite directions to thoroughly mix the feed.

A further objective of the present invention is the provision of a feed mixer having augers which rotate in opposite directions on each side of the feed chamber so as to move the feed to and from each end of the chamber.

Still another objective of the present invention is the provision of a feed mixer wherein the augers are designed to eliminate or minimize the wrapping of hay and the like around the auger shaft.

Another objective of the present invention is the provision of a feed mixer having pivotally mounted reel paddles so as to prevent binding of the paddles against the walls of the chamber.

A further objective of the present invention is the provision of a feed mixer having minimal power requirements.

Another objective of the present invention is the provision of a feed mixer which is economical to manufacture, and efficient and durable in use.

SUMMARY OF THE INVENTION

The feed mixer of the present invention has an elongated mixing chamber with forward and rearward end walls, a bottom wall, and opposite side walls. First and second mixing reels are rotatably mounted within the chamber. Each reel includes an axle, a plurality of support arms extending radially outwardly at each end of the axle, and elongated mixing paddles pivotally secured to corresponding pairs of the support arms at opposite ends of the reel. Spring bias means normally urge the paddles toward the bottom wall of the chamber while permitting the paddles to deflect away from the bottom wall to prevent binding of feed between the paddle and the bottom wall of the chamber. The paddles are disposed at approximately a 45° angle with respect to the bottom wall of the chamber. The paddles of the first reel are offset approximately 45° with respect to the paddles of the second reel.

The feed mixer further includes first and second augers having opposite inlet and outlet ends and extending along the respective side walls of the chamber. The augers are rotated in opposite directions, whereby the first auger moves feed away from the first reel and discharges feed into the second reel, and the second auger moves feed away from the second reel and discharges feed into the first reel. Each auger includes a central shaft, a length of first flighting extending from the inlet end substantially along the length of the auger, and terminating short of the outlet end thereof for conveying feed toward the outlet end, and a length of second flighting extending from the outlet end for conveying feed away from the outlet end. These first and second reversed flightings on each auger enhance the discharge of feed from the auger to the respective reel. Each auger also includes an auger paddle extending between the first and second flights, which prevents hay and the like from wrapping around the auger shaft.

A feed discharge port is provided at the outlet end of the second auger for discharging mixed feed from the chamber. A sliding door moves along the auger trough to open and close the discharge port.

BRIEF DESCRIPTION OF THE DRAWINGS

FIG. 1 is a perspective view of the feed mixer of the present invention.

FIG. 2 is a sectional view taken along lines 2—2 of FIG. 1.

FIG. 3 is a sectional view taken along lines 3—3 of FIG. 1.

FIG. 4 is a top elevational view of the feed mixer.

FIG. 5 is a perspective schematic view illustrating the movement of feed within the mixing chamber.

FIG. 6 is an enlarged end view showing the pivotal movement of a reel paddle.

DETAILED DESCRIPTION OF THE DRAWINGS

The feed mixer of the present invention is generally designated in the drawings by the reference numeral 10. Mixer 10 includes a mixing chamber 12 which is mounted upon a frame 14. Frame 14 is supported by a pair of wheels 16 and is adapted to be hitched to a tractor (not shown) by a tongue 18 attached to frame 14.

Chamber 12 has a forward end 20, a rearward end 22, a bottom wall 24, and opposite side walls 26 and 28, as best seen in FIG. 2. The top of chamber 12 is open to provide easy loading of feed into the chamber. Bottom wall 24 is curved upwardly from the longitudinal center line of chamber 12, and terminates in an upper ridge 30 spaced inwardly from each side wall. Concave auger troughs 32, 33 extend between upper ridge 30 and the respective side wall 26, 28. A vertically disposed central plate 34 is rigidly secured to bottom wall 24 midway between forward end 20 and rearward end 22 of chamber 12, as best seen in FIGS. 2 and 4.

A first mixer reel 36 and a second mixer reel 38 are rotatably mounted in end-to-end relationship within chamber 12. More particularly, each reel 36, 38 includes an axle 40, a plurality of arms 42 extending radially outwardly from each end of axle 40, and a plurality of elongated paddles 44 pivotally secured to the outer ends of a pair of arms 42 at opposite ends of axle 40. As seen in FIG. 4, axle 40 of reel 36 extends from forward end 20 of chamber 12 and central plate 34, while axle 40 of second reel 38 extends from central plate 34 to the rearward end 22 of chamber 12. Appropriate bearings rotatably support axles 40 at their opposite ends. Support members 46 extend between adjacent arms 42 to provide structural rigidity to the reels 36, 38.

As best seen in FIGS. 2 and 6, each paddle 44 is pivotally connected to the respective arms 42 by a pin 48. Each paddle 44 is also disposed at approximately a 45° angle with respect to bottom wall 24 of chamber 12. Spring bias means 50 has opposite ends attached to paddle 44 and arm 42 so as to normally urge paddle 44 toward bottom wall 24, while permitting the paddle to deflect away from the bottom wall when encountering a lump of feed material so as to eliminate binding of the feed material between the paddle and the bottom wall of the chamber. Such deflection is illustrated by solid lines in FIG. 6, with the dotted lines therein being the normal position of paddle 44. More particularly, spring bias means 50 includes an elongated shaft 52 having a lower end connected to paddle 44 and an upper end slidably extending through a flange 54 mounted on arm 42. A compressible spring 56 surrounds shaft 52 and yieldably urges paddle 44 to the position shown in dotted lines in FIG. 6.

A first auger 58 is rotatably mounted within trough 32 and a second auger 60 is mounted in trough 33. Auger 58 has an inlet end 62 and an outlet end 64 while second auger 62 similarly has an inlet end 66 and an outlet end 68. Each auger includes a rotatable shaft 70 with a first flighting 72 extending from the respective inlet end of the auger and terminating short of the respective outlet end of the auger so as to convey feed toward the outlet end. A second flighting 74 is reversed from first flighting 72 and extends from the respective outlet end of the auger towards the first flighting. An auger paddle 76 extends between the adjacent ends of the first and second flightings. Second flighting 74 enhances the discharge of feed from the auger, while auger paddle 76 prevents hay or the like from being wrapped around auger shaft 70.

Feed mixer 10 includes drive means for rotating first and second reels 36, 38 in opposite directions, and for rotating first and second augers 58, 60 in opposite directions. More particularly, the drive means of feed mixer 10 is connected to the power take-off of the tractor by a drive shaft 78, and includes a plurality of gears and interconnecting driving chains (not shown) for imparting the proper rotation to the reels and augers. Such driving gears and chains are well known, and are housed externally of chamber 12, but within housing 80 so as to be protected from the elements and from feed, and for safety purposes. The gears and driving chains are self-lubricating.

Auger trough 33 includes a discharge port 82 adjacent the discharge end thereof, as illustrated in FIG. 5. A door 84 slides with respect to discharge port 82 to open and close the port. The movement of door 84 is controlled by hydraulic cylinder 86, or in the alternative, door 84 may be manually moved between the open and closed positions.

In operation, first reel 36 and second reel 38 are rotated in opposite directions, as indicated by arrows 88 and 90 in FIG. 5, so that the center of gravity of the feed remains substantially along the longitudinal center line of chamber 12. More particularly, as represented by the semi-circular arrangement of arrows in FIGS. 2 and 3, each reel tends to load the feed material to one side of the chamber. Since each reel tends to load the feed mixed thereby to opposite sides of chamber 12, the overall center of gravity remains along the longitudinal centerline of the chamber.

As first reel 36 rotates, paddles 44 thereon carry feed along bottom wall 24 of chamber 12. As the paddles pass by first auger 58, a portion of the feed is deposited therein as indicated by arrows 92 in FIGS. 2 and 4. The feed is conveyed by auger 58 to second reel 38 wherein the feed is discharged, as indicated by arrows 94 in FIGS. 3 and 4. Second reel 38, which is rotating in the opposite direction as first reel 36, moves feed along bottom wall 24 of chamber 12 and deposits a portion of such feed into second auger 60, as indicated by arrows 96 in FIGS. 3 and 4, which conveys the feed away from second reel 38. The feed carried by auger 60 is either discharged back into the path of first reel 36, as indicated by arrows 98 in FIGS. 2 and 4, or discharged out of chamber 12 through discharge port 82, as indicated by arrows 100 in FIG. 5.

Thus, the feed is thoroughly mixed by the rotating reels 36, 38 and by the augers 58, 60 which moves the feed from end to end within the chamber, along a circular or rectangular path as indicated by arrows 102 in FIG. 5. Since auger shafts 70 are positioned at an elevation below reel axles 40, the distance which the feed is carried upwardly by paddles 44 is minimized, thereby minimizing the power required to drive reels 36 and 38.

From the foregoing, it is seen that the present invention accomplishes at least all the stated objectives.

What is claimed is:
1. A feed mixing device, comprising:
    a mixing chamber having forward and rearward end walls, a bottom wall and opposite side walls;
    first and second rotatable mixing reels, each including an axle and a plurality of elongated mixing paddles operatively connected to the axle;
    said reels being positioned within said chamber in an end-to-end relationship;
    means for moving the feed longitudinally within said mixing chamber; and
    means for rotating said first and second reels in opposite direction such that each reel moves the feed towards opposite side walls of the mixing chamber and thereby substantially maintaining the center of gravity of the feed being mixed midway between the side walls of said chamber; and a discharge port in said mixing chamber for discharging mixed feed from said chamber.
2. The feed mixing device of claim 1 wherein said means for longitudinally moving said feed comprises first and second augers having opposite inlet and outlet ends and extending along respective side walls of said chamber, and means for rotating the augers in opposite directions, said first auger moving feed away from said first reel and discharging feed into said second reel, and said second auger moving feed away from said second reel and discharging feed into said first reel.
3. The feed mixing device of claim 2 wherein each auger has a central shaft having opposite first and second ends, a length of first flighting extending from said first end substantially along the length of said shaft for conveying feed toward said second end, said first flighting terminating short of said second end, and a length of second flighting extending from said second end for conveying feed away from said second end, and thereby enhance the discharge of feed from the auger to the respective reel.

4. The feed mixing device of claim 3 wherein an auger paddle extends between said first and second flightings to prevent feed from wrapping around said shaft of said auger.

5. The feed mixing device of claim 3 wherein said auger shafts are at a lower elevation than said axles of said reels.

6. The feed mixing device of claim 2 further comprising a feed discharge port adjacent the outlet end of said second auger for discharging mixed feed from said chamber, and means for opening and closing said discharge port.

7. The feed mixing device of claim 1 wherein each reel includes a plurality of support arms extending radially outwardly from said axle and means for pivotally securing said mixing paddles to said arms.

8. The feed mixing device of claim 7 wherein said means for pivotally securing said paddles includes spring bias means for normally urging said paddle toward said bottom wall of said chamber, said spring bias means permitting said paddle to deflect away from said bottom wall of said chamber to eliminate binding of feed between said paddle and said bottom wall of said chamber.

9. The feed mixing device of claim 1 wherein said paddles are disposed approximately 45° with respect to the bottom wall of said chamber.

10. The feed mixing device of claim 1 wherein the paddles of said first reel are offset approximately 45° with respect to the paddles of said second reel.

11. A feed mixing device, comprising:
a mixing chamber having forward and rearward end walls, a bottom wall and opposite side walls;
first and second rotatable mixing reels, each including an axle and a plurality of elongated mixing paddles operatively connect to the axle;
said reels being positioned within said chamber in an end-to-end relationship;
means for rotating said first and second reels in opposite directions such that each reel moves the feed toward opposite side walls of the mixing chamber and thereby substantially maintaining the center of gravity of the feed being mixed midway between the side walls of said chamber;
first and second augers having opposite inlet and outlet ends and extending along respective side walls of said chamber; and
means for rotating the augers in opposite directions, said first auger moving feed away from said first reel and discharging feed into said second reel, and said second auger moving feed away from said second reel and discharging feed into said first reel.

12. The method of mixing feed in a mixing chamber having forward and rearward end walls, a bottom wall and opposite first and second side walls, comprising:
rotating first and second mixing reels in opposite directions such that a first portion of said feed is moved toward said first side wall by said first reel and a second portion of said feed is moved towards said second side wall by said second reel,
moving said feed forwardly and rearwardly within said chamber, and
discharging mixed feed through a discharge port in said chamber.

13. The method of claim 12 further comprising dumping said first and second portions of feed into first and second augers respectively, extending along said first and second side walls, respectively, and moving said portions of feed in opposite forward and rearward directions with said augers and then unloading said first and second portions of feed from the respective augers for movement toward said second and first side walls by said second and first reels, respectively, and then into said second and first augers for movement in rearward and forward directions, respectively, such that each portion of feed moves in a closed circuit path through said chamber.

* * * * *